(12) United States Patent
Wu

(10) Patent No.: US 9,920,821 B2
(45) Date of Patent: Mar. 20, 2018

(54) DRIVING APPARATUS FOR HIGH-LOAD LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 15/004,821

(22) Filed: Jan. 22, 2016

(65) Prior Publication Data

US 2016/0138689 A1    May 19, 2016

Related U.S. Application Data

(63) Continuation of application No. 14/258,915, filed on Apr. 22, 2014, now Pat. No. 9,279,483, which is a
(Continued)

(51) Int. Cl.
*F16H 25/20* (2006.01)
*F16H 25/24* (2006.01)
(Continued)

(52) U.S. Cl.
CPC ............ *F16H 25/20* (2013.01); *F16H 19/02* (2013.01); *F16H 25/2454* (2013.01); *E05Y 2201/49* (2013.01); *F16D 13/08* (2013.01); *F16D 41/04* (2013.01); *F16D 41/20* (2013.01); *F16D 41/206* (2013.01); *F16D 2125/38* (2013.01); *F16D 2125/40* (2013.01); *F16H 2025/209* (2013.01);
(Continued)

(58) Field of Classification Search
CPC ................ F16H 25/20; F16H 25/2454; F16H 2025/209; F16H 2025/2084; F16H 2025/2463; F16D 13/08; F16D 41/20; F16D 41/206; F16D 41/04; F16D 2125/38; F16D 2125/40
USPC ........ 74/89.34, 89.37–89.39, 411.5; 188/72.8
See application file for complete search history.

(56) References Cited

U.S. PATENT DOCUMENTS

| 4,660,698 A * | 4/1987 | Miura .................... F16D 41/067 192/45.016 |
| 7,594,450 B2 * | 9/2009 | Wu .......................... H02K 7/06 5/616 |

(Continued)

*Primary Examiner* — William Kelleher
*Assistant Examiner* — Randell J Krug
(74) *Attorney, Agent, or Firm* — Chun-Ming Shih; HDLS IPR Services

(57) ABSTRACT

A high-load linear actuator includes a driving mechanism, a worm shaft, a worm wheel assembly, a lead screw, a telescopic pipe and an outer pipe. The driving mechanism includes a base and a motor. The base has a supporting portion and an accommodating portion. The motor is fixed to the supporting portion. The worm shaft extends from the motor into the supporting portion. The worm wheel assembly includes a worm wheel and two bearings for supporting the worm wheel in the accommodating portion. The worm wheel is engaged with the worm shaft. The lead screw is disposed through the worm wheel and driven by the motor for rotation. The telescopic pipe slips on the lead screw to be threadedly connected therewith. The outer pipe slips on the telescopic pipe. The rotation of the lead screw drives the telescopic pipe to linearly extend or retract relative to the outer pipe.

5 Claims, 9 Drawing Sheets

Related U.S. Application Data continuation of application No. 13/045,650, filed on Mar. 11, 2011, now Pat. No. 8,733,192.

(51) Int. Cl.
*F16H 19/02* (2006.01)
*F16D 13/08* (2006.01)
*F16D 41/20* (2006.01)
*F16D 125/40* (2012.01)
*F16D 41/04* (2006.01)
*F16D 125/38* (2012.01)

(52) U.S. Cl.
CPC .............. *F16H 2025/2084* (2013.01); *F16H 2025/2463* (2013.01); *Y10T 74/18576* (2015.01); *Y10T 74/18664* (2015.01); *Y10T 74/18704* (2015.01); *Y10T 74/18792* (2015.01); *Y10T 74/19833* (2015.01)

(56) References Cited

U.S. PATENT DOCUMENTS

| | | | |
|---|---|---|---|
| 2004/0093969 A1* | 5/2004 | Nielsen | A47C 20/041 74/89.23 |
| 2006/0278494 A1* | 12/2006 | Itomi | F16D 41/105 192/223.2 |
| 2007/0144279 A1* | 6/2007 | Wu | H02K 7/06 74/22 A |
| 2008/0163553 A1* | 7/2008 | Liao | E05F 11/423 49/362 |
| 2008/0210029 A1* | 9/2008 | Wang | F16H 25/20 74/89.38 |
| 2009/0050451 A1* | 2/2009 | Sorensen | F16H 25/20 200/61.85 |
| 2011/0079486 A1* | 4/2011 | Tseng | F16H 25/2454 192/223.2 |

\* cited by examiner

DRIVING APPARATUS FOR HIGH-LOAD LINEAR ACTUATOR

CROSS-REFERENCE TO RELATED APPLICATIONS

This application is a continuation application of U.S. application Ser. No. 14/258,915 filed on Apr. 22, 2014, which in turn is a continuation application of U.S. application Ser. No. 13/045,650 filed on Mar. 11, 2011. The entire disclosure is incorporated herein by reference.

FIELD OF THE INVENTION

The present invention relates to an actuator, in particular to a high-load linear actuator used for equipments such as a medical apparatus and an electric chair.

BACKGROUND OF THE INVENTION

As the economic development of our society advances and people eat high-nutrition high-calorie foods more often, our average body weight increases constantly, so that medical apparatus or electric chair related manufacturers keep designing and introducing improved linear actuators for the aforementioned equipments to meet market requirements.

The conventional linear actuator mainly uses driving components such as a motor together with a worm shaft and a worm wheel to drive and rotate a lead screw, while driving a telescopic pipe screwed with the lead screw and extending or retracting the telescopic pipe linearly. The foregoing components are combined to constitute a linear actuator.

Since the conventional linear actuator can be used for a low-load medical apparatus, it cannot satisfy incremental product requirements of a high-load linear actuator if safe load and lifespan are taken into consideration. Furthermore, a linear actuator applied to a high-load equipment has a telescopic pipe moving at a speed which will affect the comfort and safety of users. Therefore, the conventional linear actuator requires improvements.

In view of the aforementioned shortcomings of the prior art, the inventor of the present invention based on years of experience in the related industry to conduct extensive researches and experiments, and finally developed a feasible solution in accordance with the present invention to overcome the shortcomings of the prior art.

SUMMARY OF THE INVENTION

Therefore, it is a primary objective of the present invention to provide a high-load linear actuator that uses the structure of a driving mechanism and a worm wheel assembly to provide a stable support, such that the linear actuator can be applied to high-load equipments.

To achieve the foregoing objective, the present invention provides a high-load linear actuator, comprising a driving mechanism, a worm shaft, a worm wheel assembly, a lead screw, a telescopic pipe and an outer pipe. The driving mechanism has a base and a motor that can be rotated clockwise and counterclockwise, and the base has a supporting portion and an accommodating portion, and the supporting portion has a seat and a hollow cylinder formed and extended from the seat, and the accommodating portion has a ring body coupled to the hollow cylinder, and the motor is mounted onto the seat. The worm shaft is protruded from the motor and passed into the hollow cylinder. The worm wheel assembly has a worm wheel and two bearings for jointly supporting the worm wheel installed inside the ring body, and the worm wheel is engaged and transmitted with the worm shaft. The lead screw is passed through and coupled to the worm wheel, and actuated by the motor to produce a rotation. The telescopic pipe is sheathed onto the exterior of the lead screw and screwed with the lead screw; and the outer pipe is sheathed onto the exterior of the telescopic pipe, and the telescopic pipe is rotated and driven by the lead screw to extend or retract linearly with respect to the outer pipe.

The present invention also has the following effects and uses a design of the base and the worm wheel assembly to achieve the effects of enhancing the stability of supporting the worm wheel in the ring body and reducing the assembling and disassembling time for installation, repair and maintenance. With the installation of the retardation transmission mechanism and the friction of each rolling needle with the intermediate ring, the lead screw can be rotated in a specific direction and hindered to achieve the retardation effect. The intermediate ring is used for rotating the torque spring easily, such that the transmission mechanism has a good transmission performance. When the lead screw is pushed by a force in an opposite direction, the intermediate ring, each rolling needle, the driven bushing and the lead screw will not produce a relative transmission, so that the lead screw can be fixed securely to prevent the lead screw from sliding out from the nut effectively. The friction produced between the transmission components increases with the load, so that if there is no load, there will be no unnecessary friction or any power consumption. The telescopic pipe retracted at a speed substantially the same for different loads, and thus the telescopic pipe can be descended at a constant speed, and the actuator can be used comfortably.

DESCRIPTION OF THE PREFERRED EMBODIMENTS

The technical characteristics and contents of the present invention will become apparent with the following detailed description and related drawings. The drawings are provided for the purpose of illustrating the present invention only, but not intended for limiting the scope of the invention.

Figure 1:
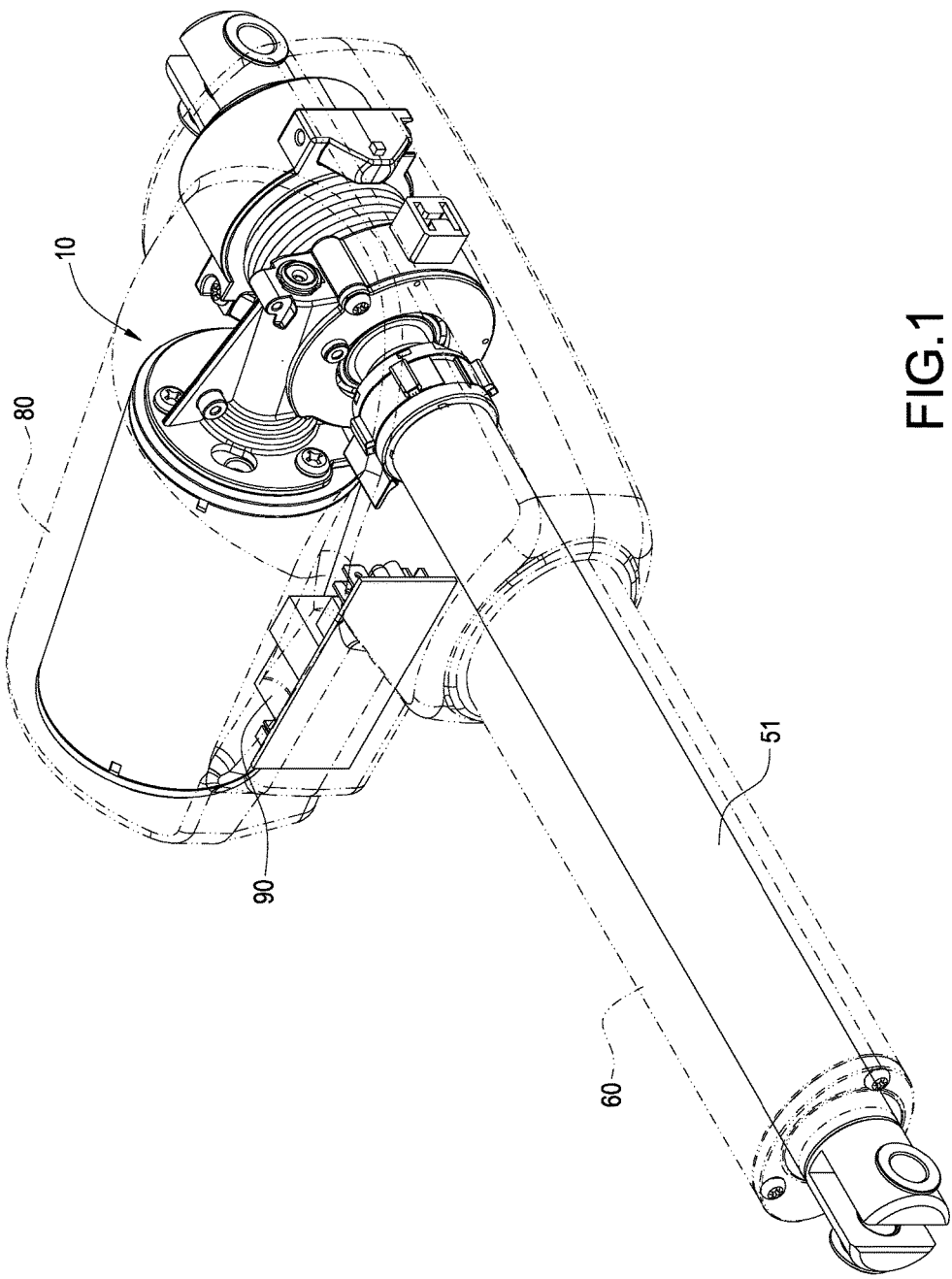
FIG. 1 is a perspective view of a linear actuator of the present invention.
Figure 8:
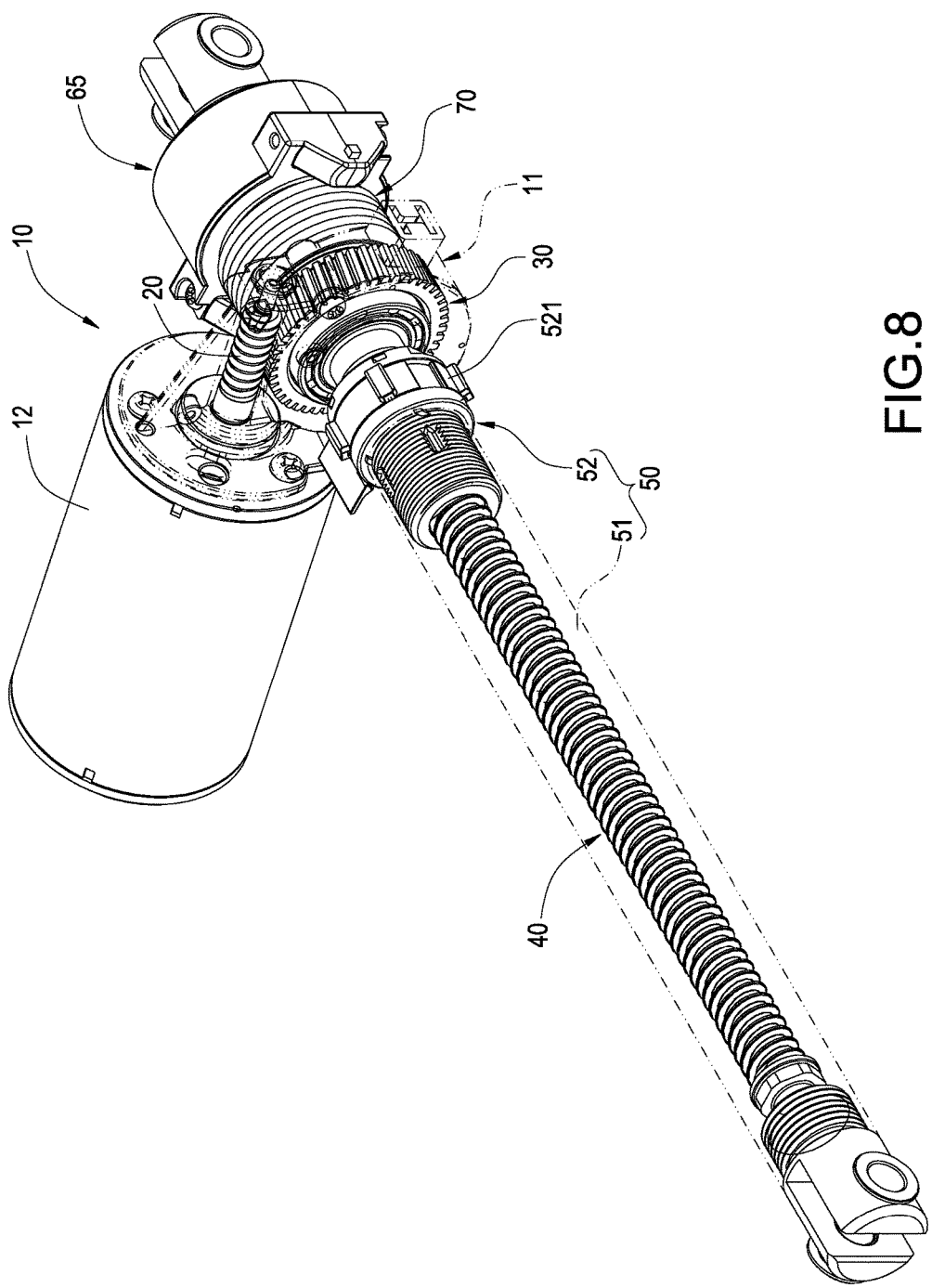
FIG. 8 is a perspective view of a linear actuator of the present invention.

With reference to FIG. 1 for a high-load linear actuator of the present invention, the actuator is primarily applied to a load of hundreds or thousands of kilograms, and the high-load linear actuator comprises a driving mechanism 10, a worm shaft 20, a worm wheel assembly 30, a lead screw 40, a telescopic pipe 50 (as shown in FIG. 8) and an outer pipe 60.

Figure 2:
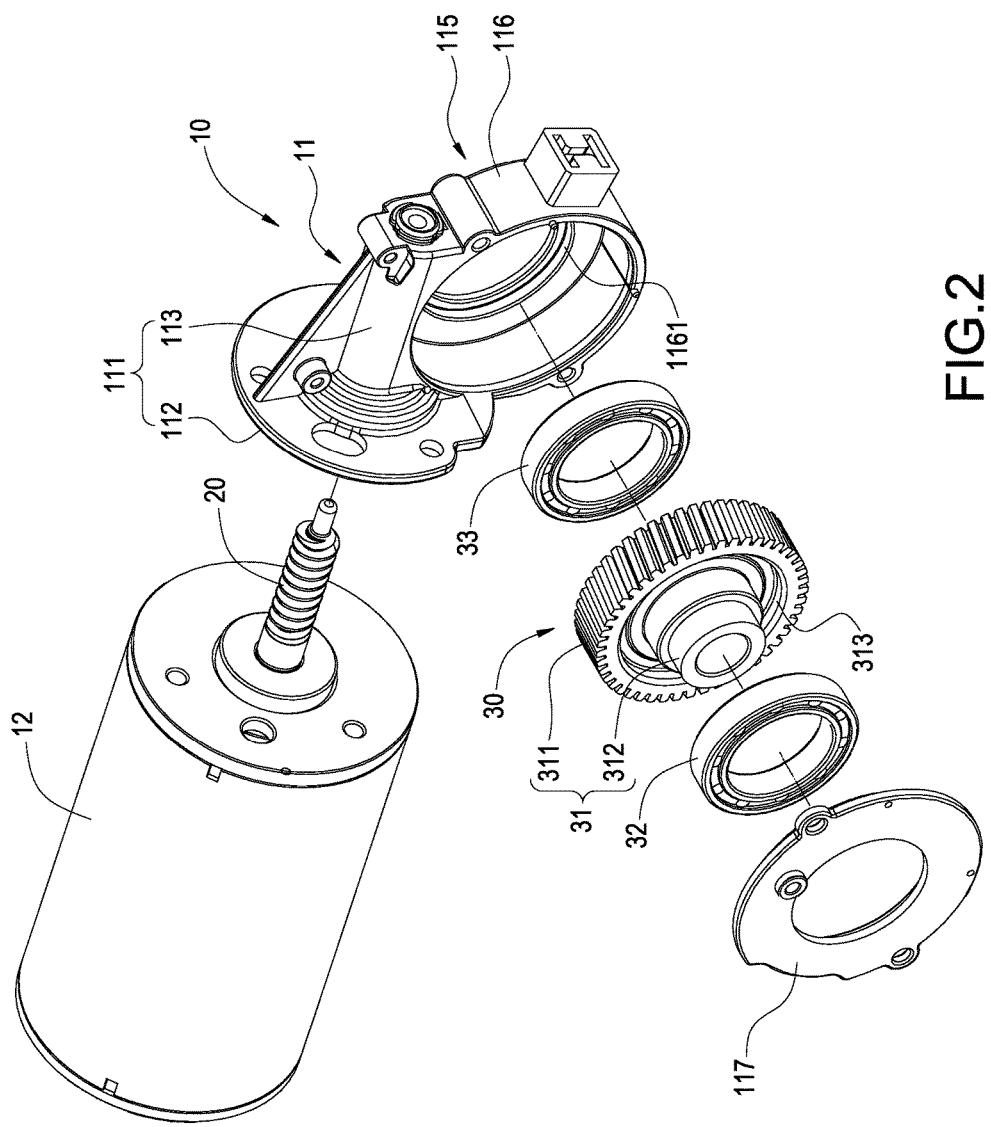
FIG. 2 is an exploded view of a driving mechanism and a worm wheel assembly of the present invention.
Figure 3:
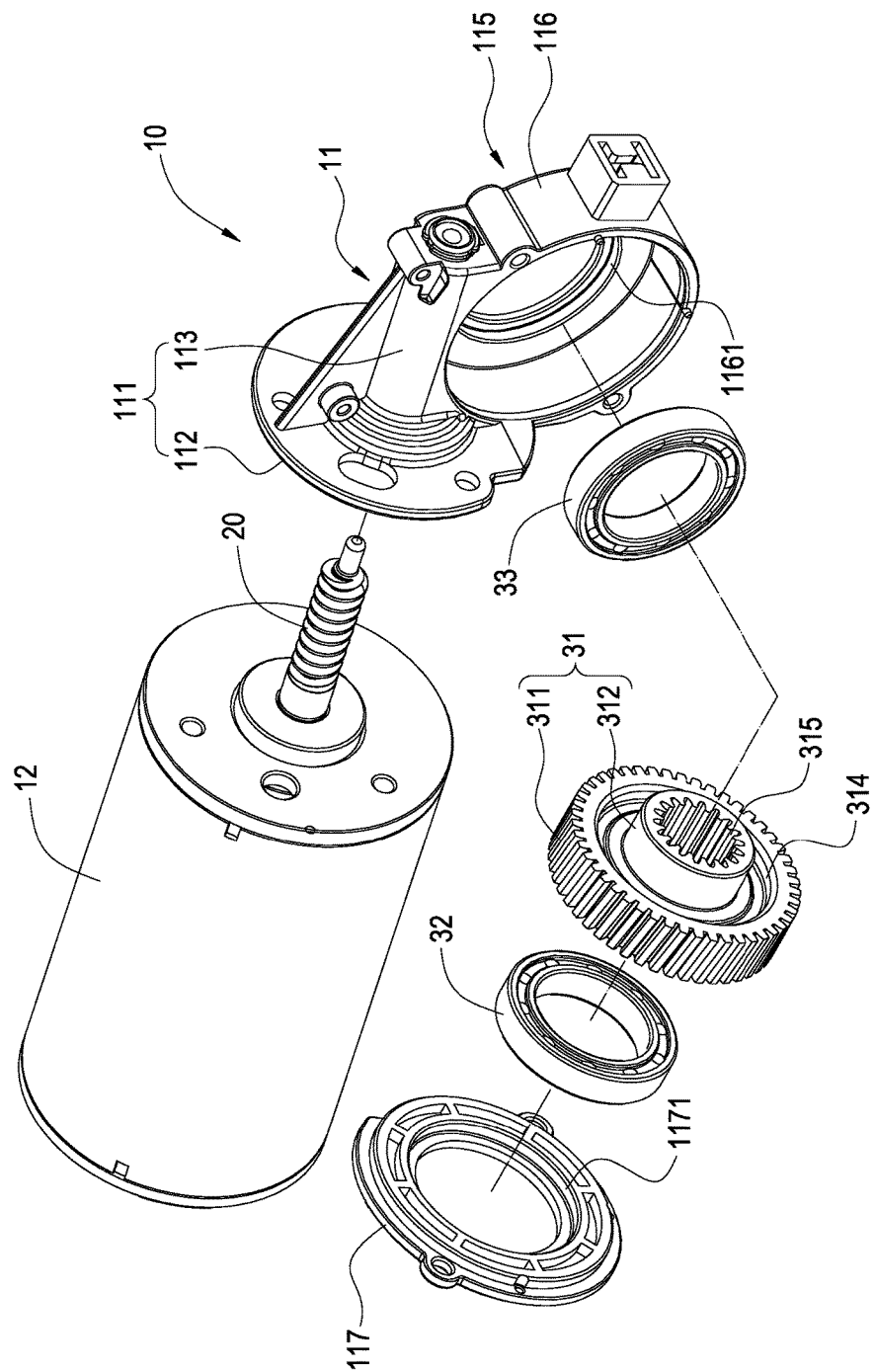
FIG. 3 shows FIG. 2 from another viewing angle.
Figure 4:
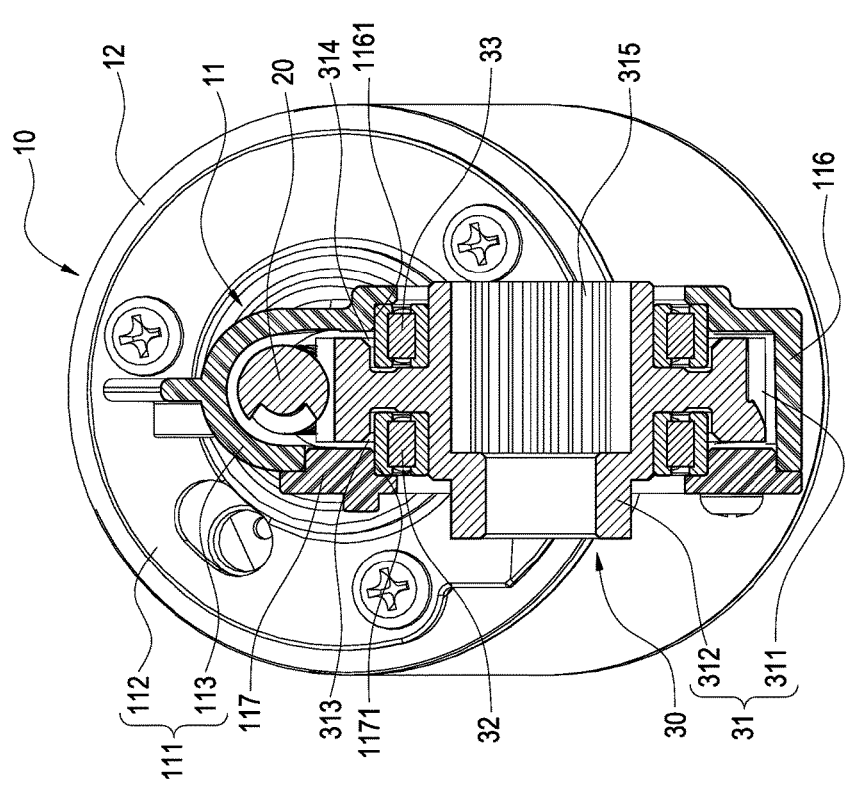
FIG. 4 is a cross-sectional view of each component of FIG. 2.

With reference to FIGS. 2 to 4, the driving mechanism 10 includes a base 11 and a motor 12 which can be rotated clockwise and counterclockwise. The base 11 has a supporting portion 111 and an accommodating portion 115, and the supporting portion 111 is formed by a plate-shaped seat 112 and a hollow cylinder 113 extended upwardly from the seat 112. The motor 12 is mounted to the bottom of the seat 112 by screws (not shown in the figures). The accommodating portion 115 has a circular ring body 116 and a cover plate 117, and the circular ring body 116, the seat 112 and the hollow cylinder 113 are integrally formed. In addition, a rear step 1161 is formed on an internal side of the circular ring body 116, and the cover plate 117 is secured to a lateral edge of the circular ring body 116 by screws (not shown in the figures), and a front step 1171 is formed on a side of the cover plate 117 and corresponsive to the circular ring body 116 (as shown in FIG. 3).

The worm shaft 20 can be an axle of the motor 12 and protrudes from the center of the motor 12, or connected to and extended from the center of motor 12. When the motor 12 is fixed to the seat 112, the worm shaft 20 is passed into the hollow cylinder 113, and a free end of the worm shaft 20 is installed to the hollow cylinder 113 by a bushing to enhance the fixing stability.

The worm wheel assembly 30 comprises a worm wheel 31, a front bearing 32 and a rear bearing 33, and the worm wheel 31 has a circular tooth flank 311, a hollow axle 312 coupled to the circular tooth flank 311, and front and rear containing grooves 313, 314 formed between the circular tooth flank 311 and the hollow axle 312. In addition, a plurality of internal ribs 315 are formed at a rear side of the hollow axle 312 (as shown in FIG. 3), and the circular tooth flank 311 is engaged and transmitted with the worm shaft 20. With reference to FIG. 4, the front bearing 32 is sheathed on the hollow axle 312 and contained in the front containing groove 313, a portion of an area of the external periphery of the front bearing 32 is exposed from the circular tooth flank 311, and the exposed area of the front bearing 32 is fixed into the front step 1171 of the cover plate 117. Similarly, the rear bearing 33 is sheathed on the hollow axle 312 and contained in the rear containing groove 314, and a portion of an area of the external periphery of the rear bearing 33 is exposed from the circular tooth flank 311, and the exposed area of the rear bearing 33 is fixed into the rear step 1161 of the circular ring body 116, such that the worm wheel 31 can be supported jointly by the circular ring body 116 and the cover plate 117 in the accommodating portion 115.

Figure 5:
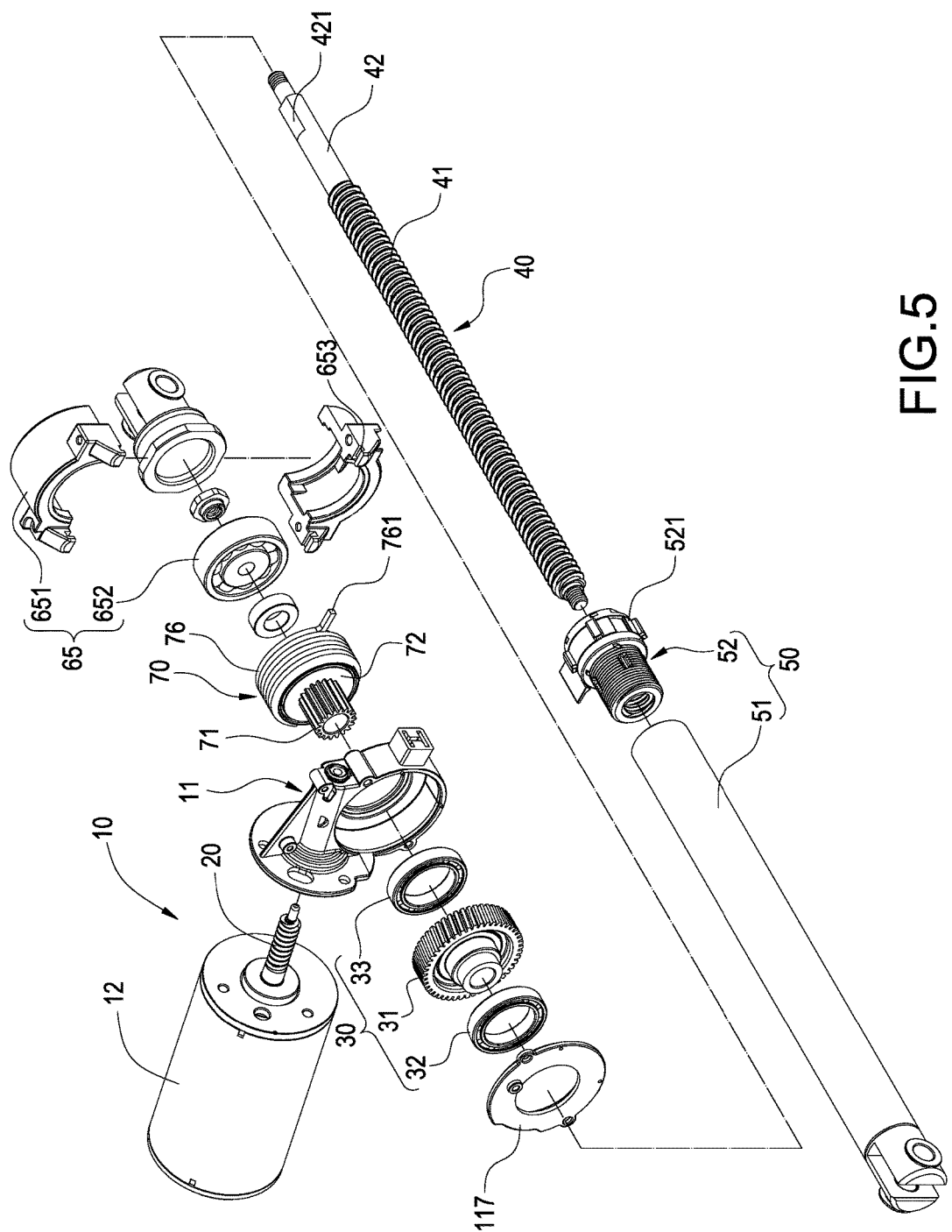
FIG. 5 is an exploded view of a linear actuator of the present invention.

With reference to FIG. 5, the lead screw 40 has a threaded section 41 and a circular shaft section 42 extended from the threaded section 41. An external positioning plane 421 is formed at an end of the circular shaft section 42 and away from the threaded section 41, and an end of the lead screw 40 is passed into the hollow axle 312 of the worm wheel 31 (as shown in FIG. 9), and the other end of the lead screw 40 is extended outwardly in a direction away from the base 11, and the lead screw 40 is driven by the motor 12 to drive the worm shaft 20 and the worm wheel 31 to produce a rotation.

Figure 9:
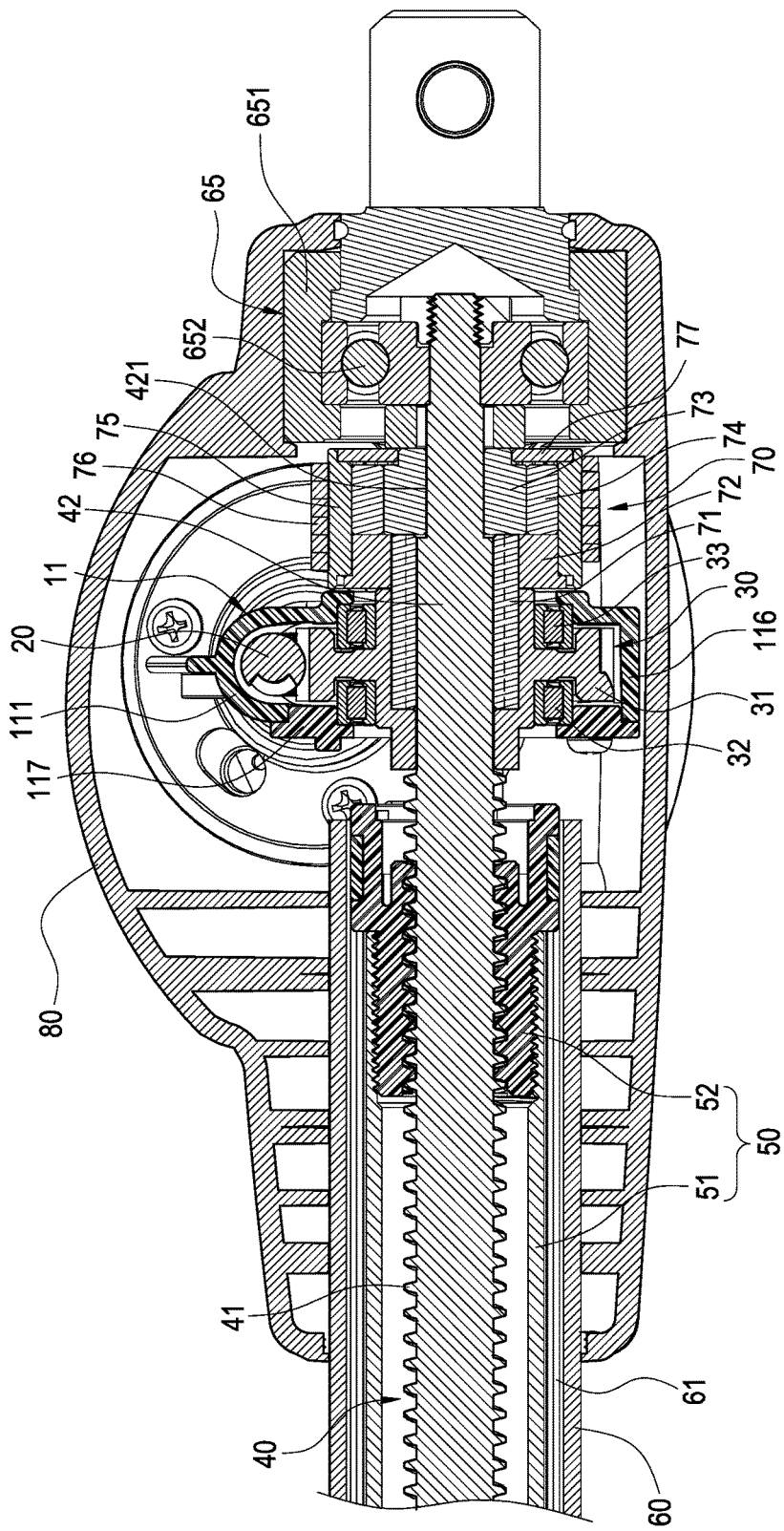
FIG. 9 is a cross-sectional view of a linear actuator of the present invention.

The telescopic pipe 50 has a pipe body 51, a nut 52 fixed to a distal portion of the pipe body 51 and screwed and transmitted with the lead screw 40 (as shown in FIG. 9), and a plurality of embedding lumps 521 protruded from the external periphery of the nut 52.

The outer pipe 60 is sheathed onto the exterior of the pipe body 51 of the telescopic pipe 50 (as shown in FIG. 1), and the outer pipe 60 includes a plurality of trenches 61 (as shown in FIG. 9) formed therein and provided for embedding each embedding lump 521 to limit the rotation of the telescopic pipe 50. After the telescopic pipe 50 is driven by the rotation of the lead screw 40, the telescopic pipe 50 extends or retracts linearly with respect to the outer pipe 60.

The linear actuator of the present invention further comprises a rear supporting mechanism 65 (as shown in FIG. 5) including two half covers 651 and a roller bearing 652 clamped and fixed jointly by the two half covers 651, and the roller bearing 652 is provided for passing, coupling and installing an end of the lead screw 40 to enhance the stability of operating the lead screw 40 and the telescopic pipe 50. In addition, a notch 653 is formed at the joint of the two half covers 651.

Figure 6:
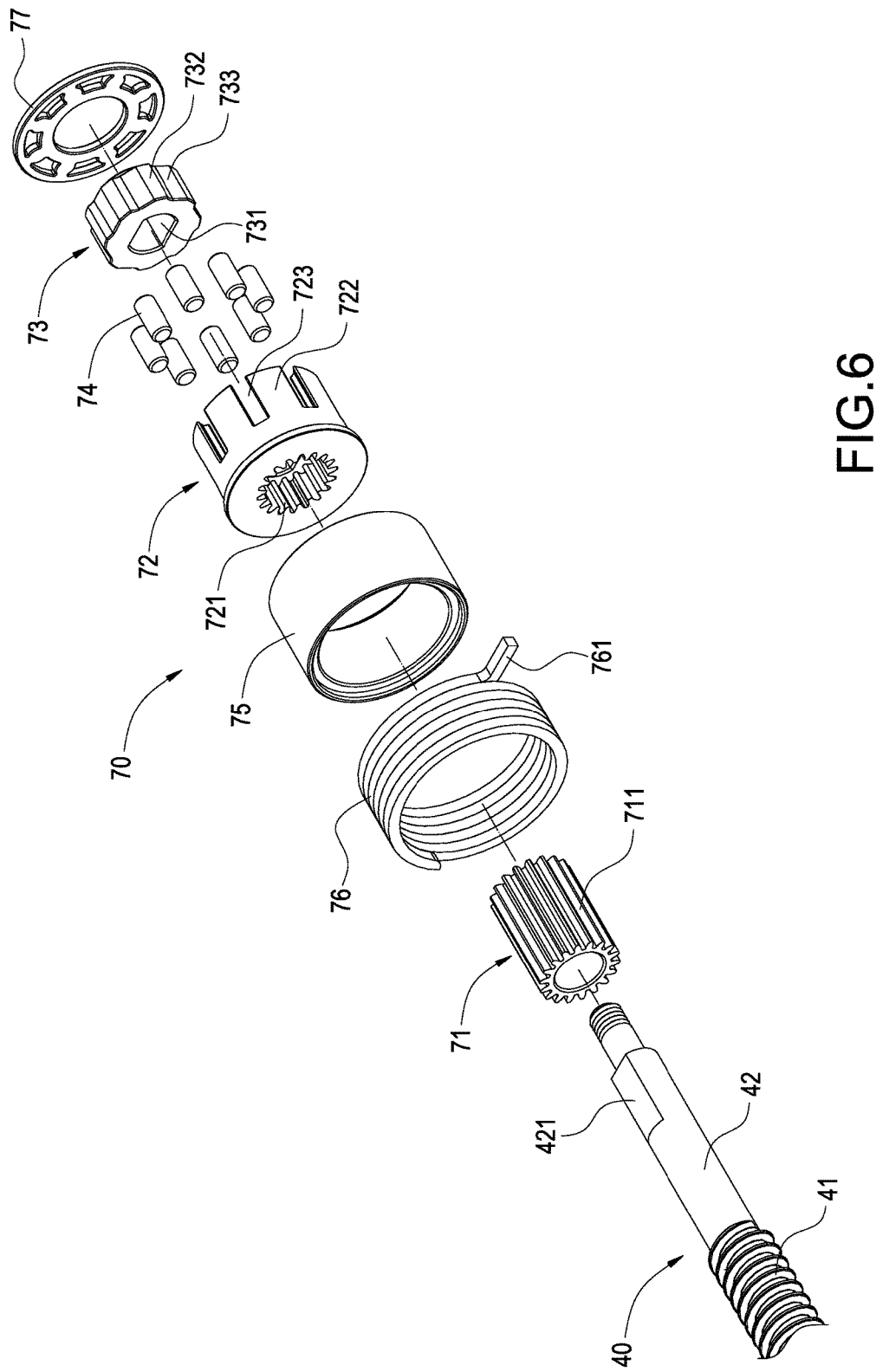
FIG. 6 is an exploded view of a retardation transmission mechanism of the present invention.
Figure 7:
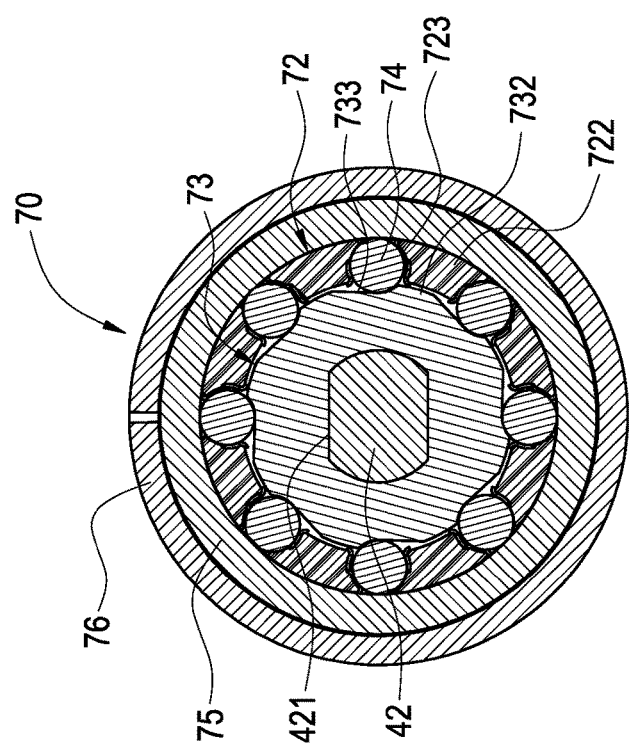
FIG. 7 is a cross-sectional view of a retardation transmission mechanism of the present invention.

With reference to FIGS. 6 and 7, the linear actuator of the present invention further comprises a retardation transmission mechanism 70 sheathed and coupled to the lead screw 40 and disposed between the rear supporting mechanism 65 and the worm wheel assembly 30. The retardation transmission mechanism 70 comprises a connector 71, a gripper ring 72, a driven bushing 73, a plurality of rolling needles 74, an intermediate ring 75, a torque spring 76 and a position-limiting catch cover 77. The connector 71 is sheathed and coupled to a position of the circular shaft section 42 of the lead screw 40 and has a portion passed and coupled to the internal gear 315 of the worm wheel 31. The gripper ring 72 has a plurality of ratcheted grooves 721 latched with a plurality of external ribs 711 of the connector 71 respectively, a plurality of gripper arms 722, and a separating slot 723 formed between any two adjacent gripper arms 722.

The driven bushing 73 has an internal positioning plane 731, a plurality of protruding stripes 732 extended from the external periphery of the driven bushing 73, and a ditch 733 formed between any two adjacent protruding stripes 732. The driven bushing 73 is sheathed and coupled to the lead screw 40, and the internal positioning plane 731 and the external positioning plane 421 of the circular shaft section 42 are embedded with each other and rotated together, and the driven bushing 73 is contained in each gripper arm 722 of the gripper ring 72. Each rolling needle 74 is inserted and coupled into a space enclosed by each separating slot 723 and each ditch 733. The intermediate ring 75 is sheathed and coupled to the external periphery of the gripper ring 72 and contacted with each rolling needle 74. The torque spring 76 includes a positioning section 761 bent from the torque spring 76, and the torque spring 76 is bound with the external periphery of the intermediate ring 75 by an elastic force, and the positioning section 761 is passed and fixed into the notch 653. The position-limiting catch cover 77 is sheathed and coupled to a side of the driven bushing 73 to seal distal surfaces of the gripper ring 72 and each rolling needle 74 (as shown in FIG. 9).

With reference to FIGS. 8 and 9, the linear actuator of the present invention further comprises a housing 80 covered onto the exterior of the driving mechanism 10 and the retardation transmission mechanism 70 and supported by the rear supporting mechanism 65 for passing a side of the outer pipe 60.

In addition, the linear actuator of the present invention further comprises an electric unit 90 (as shown in FIG. 1) installed in the housing 80 and disposed on a lateral edge of the motor 12.

In FIG. 8, when the worm wheel 31 is driven by the worm shaft 20 to rotate clockwise, the lead screw 40 drives the telescopic pipe 50 to retract towards the interior of the outer pipe 60. In FIG. 7, each gripper arm 722 pushes the intermediate ring 75 and each rolling needle 74 to rotate, such that the rotation direction of the torque spring 76 is the same as the rotating direction of the worm wheel 31, and the positioning section 761 is fixed into the notch 653 of the half cover 651 (as shown in FIG. 5), and the torque spring 76 produces a binding force to latch and stop the intermediate ring 75 (In other words, the intermediate ring 75 is held securely without being rotated), such that each gripper arm 722 drives each rolling needle 74 and increases the friction of the intermediate ring to reduce the rotation speed of the lead screw 40. Therefore, when the linear actuator is installed to an electric bed or chair, the speed for the telescopic pipe 50 to be retracted into the outer pipe 60 is slower in order to improve the user's comfort.

When the worm wheel 31 is driven by the worm shaft 20 in an opposite direction and rotated counterclockwise, the lead screw 40 drives the telescopic pipe 50 to extend out from the outer pipe 60. In FIG. 7, each gripper arm 722 pushes the intermediate ring 75 and each rolling needle 74 to rotate. Since the rotation direction of the torque spring 76 is opposite to the rotation direction of the worm wheel 31, therefore the torque spring 76 will be loosened by the rotation of the intermediate ring 75 easily. Now, the friction damp among the intermediate ring 75, the torque spring 76 and each rolling needle 74 is small, so that the intermediate ring 75 can be rotated inside the torque spring 76 easily, and the internal mechanisms can have a good transmission effect.

In summation of the description above, the high-load linear actuator of present invention improves over the prior art and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A driving apparatus for a high-load linear actuator, comprising:
    a driving mechanism, having a base and a motor rotated clockwise and counterclockwise, and the base having a supporting portion and an accommodating portion, and the supporting portion having a seat and a hollow cylinder formed and extended from the seat, and the accommodating portion having a ring body coupled to the hollow cylinder, and the motor being mounted onto the seat, wherein the accommodating portion further includes a cover plate covering the ring body at an open side of the ring body, a rear step is formed on a surface of the ring body at an internal side opposite to the open side, and a front step is formed on a side of the cover plate and at a position corresponding to the rear step;
    a worm shaft, protruding from the motor and passed into the hollow cylinder;
    a worm wheel assembly, having a worm wheel and two bearings for jointly supporting the worm wheel installed inside the ring body, wherein the worm wheel has a circular tooth flank engaged and transmitted with the worm shaft, a hollow axle is coupled to the circular tooth flank and one end of the hollow axle protrudes out of the cover plate after the cover plate covers the ring body, a front containing groove and a rear containing groove are formed in the circular tooth flank to surround the hollow axle at two opposite sides of the circular tooth flank respectively, the circular tooth flank has a plurality of external gear teeth to surround the front containing groove and the rear containing groove, the two bearings are embedded in the front and the rear containing grooves and sheathed on opposite ends of the hollow axle respectively, one of the two bearings is installed and contained in between the front containing groove and the front step, and the other of the two bearings is installed and contained in between the rear containing groove and the rear step;
    a lead screw, an end of the lead screw penetrating through the hollow axle, another end of the lead screw screwing into a telescopic pipe, the telescopic pipe including a pipe body and a nut fixed to a distal portion of the pipe body, a plurality of embedding lumps protruded from an external periphery of the nut;
    an outer pipe sheathed onto an exterior of the pipe body and including a plurality of trenches formed in the interior surface thereof, wherein the plurality of embedding lumps are embedded into the plurality of trenches to limit the rotation of the telescopic pipe; and
    a retardation transmission mechanism comprising a connector, a gripper ring, a driven bushing, a plurality of rolling needles, an intermediate ring and a torque spring, and the connector being partially inserted into the hollow axle and coupled to the worm wheel, and the gripper ring is sheathed and coupled to the connector for linking the worm wheel and the connector synchronously, and the driven bushing being passed and coupled into the gripper ring, and the rolling needles being passed and coupled between the driven bushing and the intermediate ring, and the torque spring being provided for binding the external periphery of the intermediate ring by an elastic force.

2. The driving apparatus for a high-load linear actuator of claim 1, wherein the ring body and the hollow cylinder are integrally formed.

3. The driving apparatus for a high-load linear actuator of claim 1, wherein the hollow axle of the worm wheel includes a plurality of internal ribs, and the connector includes a plurality of external ribs latched with the internal ribs respectively, and the gripper ring also includes a plurality of ratcheted grooves for latching the external ribs respectively.

4. The driving apparatus for a high-load linear actuator of claim 1, wherein the gripper ring includes a plurality of gripper arms and a separating slot formed between any two adjacent gripper arms, and the driven bushing includes a plurality of protruding stripes extended from the external periphery of the driven bushing and a ditch formed between any two adjacent protruding stripes, and the rolling needles are contained in a space enclosed by the separating slot and the ditch, and the rolling needles are installed and enclosed by the intermediate ring.

5. The driving apparatus for a high-load linear actuator of claim 1, further comprising a housing covered onto the exterior of the driving mechanism.

* * * * *